United States Patent [19]

Repko, Jr.

[11] Patent Number: 4,950,198

[45] Date of Patent: Aug. 21, 1990

[54] GAME CALL

[76] Inventor: Edward R. Repko, Jr., 609 W. 143rd St., E. Chicago, Ind. 46312

[21] Appl. No.: 201,775

[22] Filed: Jun. 2, 1988

[51] Int. Cl.$^5$ ............................................. A63H 33/40
[52] U.S. Cl. ..................................... 446/207; 446/202; 446/209; 446/397
[58] Field of Search ............... 446/202, 207, 208, 209, 446/176, 188, 213, 397, 404; 84/330

[56] References Cited

U.S. PATENT DOCUMENTS

| 805,727 | 11/1905 | Howe | 446/209 |
|---|---|---|---|
| 2,542,720 | 2/1951 | Soklaski . | |
| 2,544,370 | 3/1951 | Walther . | |
| 2,651,141 | 9/1953 | Bicocchi . | |
| 2,969,611 | 1/1961 | Warren, Jr. | 446/202 |
| 3,803,755 | 4/1974 | Thompson . | |
| 3,811,221 | 5/1974 | Wilt | 446/202 |
| 3,955,313 | 5/1976 | Faulk | 446/208 |
| 3,991,513 | 11/1976 | Faulk . | |
| 4,764,145 | 8/1988 | Kirby | 446/202 X |

OTHER PUBLICATIONS

Exhibit A—Advertisements clipped from "Wing Supply" including "Lohman Diaphragms,""Knight & Hale Canada Tube Goose Call,""Qua_er Boy Easy Yelper."
Exhibit B—Advertisements clipped from "Wing Supply" including "Wayne Carlton's Elk Tube Call,""Perfection Tube Call,""Ben Lee's Diaphragm Calls,""Lohman Super Tube Turkey Call,"
"KH101 Regular" and "KH102 Raspy," "Woods Wise Diaphragms," "Knight & Hale Cow-Calf Call."
Exhibit C—"Wing Supply" 1989 Spring Edition, 7pp.

Primary Examiner—Robert A. Hafer
Assistant Examiner—Sam Rimell
Attorney, Agent, or Firm—Klarquist, Sparkman, Campbell, Leigh & Whinston

[57] ABSTRACT

A game call includes a substantially cylindrical body, vibratable diaphragm, split ring for fastening the diaphragm to the body, and tubular bell attachable to the body for amplifying and enhancing the sound produced by the diaphragm. The body includes an inlet end surface having a substantially conical recessed portion, an outlet end surface having two planar surface portions angled with respect to one another, and an air passage extending between the inlet and outlet end surfaces. The air passage has a flared outlet opening at the outlet end surface. The diaphragm is fastened in slightly stretched fashion to the outlet end surface such that it at least substantially covers the flared outlet opening. The diaphragm has a seam in proximate relationship to a periphery portion of the flared outlet portion, along which air from the air passage is permitted to escape.

9 Claims, 1 Drawing Sheet

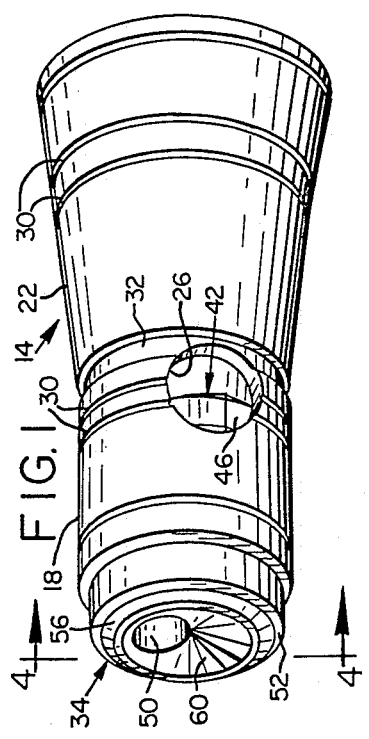

GAME CALL

FIELD OF THE INVENTION

The present invention relates to a wildlife or game call capable of simulating calls made by certain types of wildlife, especially fowl. In particular, the present invention relates to a game call having a vibratable sound producing element.

BACKGROUND OF THE INVENTION

Typically, game calls are used by hunters and others to attract game or wildlife. In hunting, for example, a game call may be used to simulate the call made by a duck, goose, wild turkey or other species of wildlife. Also, a game call may be used to attract a particular species of game by simulating the call made by the game's natural prey. Game calls may be used to attract, for example, ducks, geese, wild turkeys, coyotes and the like.

For a game call to be effective, it must realistically simulate the particular wildlife call as it exists in nature. A coyote, for example, may be attracted to a call which simulates the sound made by a dying rabbit, but only if the simulated call is sufficiently realistic.

Prior diaphragm-type game calls generally are difficult to use, particularly for beginners. Many conventional game calls require special embouchures or skilled techniques on the part of the caller to produce the desired pitch, tone and modulation required to realistically simulate a wildlife call. In addition, prior game calls generally have limited versatility. With a single game call, it typically is difficult to produce the wide variation in tone, pitch, volume and modulation required to simulate the calls of several different types of wildlife.

One prior game call comprises a tubular member having an inlet opening and a flared bell-like outlet portion terminating at an outlet opening. A vibratable rubber diaphragm is stretched over the smaller inlet opening to cover about two-thirds thereof. The caller presses his/her lip against the diaphragm and blows air over the lip, causing the diaphragm to vibrate and produce a sound which is emitted from the outlet opening. Considerable skill is required to produce the desired pitch, tone and modulation of a wildlife call.

In contrast to the game call just described, most game calls are of the vibratory reed type. Faulk U.S. Pat. Nos. 3,955,313 and 3,991,513, for example, disclose a game call having a pair of call barrels, each having an associated vibratable reed, which are mounted on opposite ends of a common throat element. The throat element defines a sound chamber and has a plurality of openings connecting the sound chamber with the atmosphere. The caller blows air into one of the two mouthpieces, causing the reed assocated therewith to vibrate. The resulting sound is emitted from one or more of the openings. The pitch of the call may be changed by closing one or more of the openings (so long as one opening or a portion thereof is left open), either by using a finger or sliding the mouthpiece closer to the center of the sound chamber.

Walther U.S. Pat. No. 2,544,370, Bicocchi U.S. Pat. No. 2,651,141 and Thompson U.S. Pat. No. 3,803,755 each disclose a call having a tubular horn and a hollow cylindrical mouthpiece removably attached to the horn. A vibratable reed is mounted centrally within the call to either the mouthpiece or horn. Air blown into an inlet opening of the mouthpiece causes the reed to vibrate, creating a sound which is emitted from an outlet end of the horn.

Sokaski U.S. Pat. No. 2,542,720 discloses a comic reed whistle. Much like the calls just described, it is a two-piece detachable unit having a mouthpiece and a bell with a flared end portion. The mouthpiece mounts a reed which vibrates when air is blown into the mouthpiece.

Accordingly, it is an object of the present invention to provide a game call which can be used easily by beginning and skilled callers alike.

Another object of the invention is to provide a game call which may be used with some success merely by blowing air into the call, and yet is capable of producing more complex calls with more refined techniques.

A further object of the invention is to provide a game call which permits the pitch, tone, volume and modulation of the sounds produced to be quickly and easily varied within a wide range.

Still another object of the invention is to provide a versatile game call capable of realistically simulating several different types of animal calls.

Yet another object of the invention is to provide a game call in which the vibratable member can be quickly and easily replaced if necessary.

Another object of the invention is to provide a game call which can be easily assembled and disassembled.

A further object of the present invention is to provide a game call adapted for use with multiple easily attachable pretuned diaphragms having different frequency and sound producing characteristics.

Other objects and advantages of the invention will be apparent from the drawings and following detailed description.

SUMMARY OF THE INVENTION

The present invention is an improved game call which includes a rigid body having an inlet end surface, outlet end surface and means defining an internal air passage extending from the inlet end surface of the outlet end surface. A vibratable diaphragm is fastened by fastening means to the body such that it overlies a portion of the outlet end surface and at least substantially covers an outlet opening of the air passage. The diaphragm has an edge or seam along which air forced through the air passage is permitted to escape. In operation, the caller blows air into the air passage at the inlet end surface. With the diaphragm at least partially covering the outlet opening of the air passage, a back pressure exists in the air passage, forcing air to exit along the seam of the diaphragm. This causes the diaphragm to vibrate, producing a sound.

In some applications, the game call preferably further includes a sound enhancing means attached to the body for amplifying and enhancing the sound produced by the vibrating diaphragm. The sound enhancing means preferably comprises a tubular member which has an opening at one end for receiving the body in coaxial, press-fit relationship. A sealing means provides a continuous seal between the tubular member and body.

In one form of the invention, the fastening means comprises a split ring to which the diaphragm is adhered or otherwise attached. The split ring has split ends and an inner diameter which is slightly less than the outer diameter of a portion of the body adjacent the outlet end surface. In most applications, the diaphragm is attached to the split ring in a relaxed, unstretched state. The split ring is inserted into the outlet end of the body by separating the split ends slightly to clear the outer diameter of the body, causing the diaphragm to stretch slightly a predetermined amount as it is snapped onto the outlet end.

Other features of the present invention will be apparent from the following detailed description.

BRIEF DESCRIPTION OF THE DRAWINGS

FIG. 1 is a perspective view of a game call in accordance with the present invention.

FIG. 2 is a perspective view of the invention showing a mouthpiece and bell thereof in a detached condition.

FIG. 3 is a perspective view similar to that of FIG. 2 but showing various components of the mouthpiece in a disassembled condition.

FIG. 4 is an end view of the present invention taken along line 4—4 of FIG. 1.

FIG. 5 is a sectional view of the present invention taken along line 5—5 of FIG. 4.

FIG. 6 is an end view of one portion of the present invention taken along line 6—6 of FIG. 3.

FIG. 7 is a perspective view of a second embodiment of one component of the present invention.

FIG. 8 is a sectional view of a second embodiment of a different component of the present invention.

DETAILED DESCRIPTION OF A PREFERRED EMBODIMENT

The present invention includes a substantially cylindrical mouthpiece 10 and a substantially tubular bell 14 which are detachably fastened to one another. Mouthpiece 10 and bell 14 are attached in coaxial relationship with the mouthpiece press fit within the inlet end of the bell. The mouthpiece functions as a sound producing means, while the bell serves as a sound enhancing means to amplify and enhance the quality of the sounds produced by the mouthpiece.

Bell 14 has a mouthpiece mounting portion 18, a flared outlet portion 22 and a pair of access openings 26 located on opposite sides of mounting portion 18. One or more circumferential grooves 30 are inscribed in the substantially cylindrical outer surface of bell 14 largely for decorative purposes. One intermediate groove 32, which is wider than the others, can be used to retain or seat a lanyard (not shown).

Mouthpiece 10 includes a plug or body 34 and an O-ring 38 seated on plug 34 to provide a circumferential seal between plug 34 and bell 14. The mouthpiece further includes a vibratable diaphragm 42 and a split ring 46 for detachably fastening the diaphragm in sound producing relationship to the mouthpiece. Plug 34 is preferably formed by injection molding (and machining, if necessary) a rigid polymeric material. Diaphragm 42 is preferably made of a relatively thin sheet of elastic polymeric material, such as silicon rubber.

Plug 34 has a substantially cylindrical outer surface, an inlet end surface, an outlet end surface, and an intenal bore wall which defines a throat or air passage 50 extending between the inlet and outlet end surfaces. More specifically, with reference particularly to FIGS. 4 and 5, the inlet end surface of plug 34 includes an annular shoulder portion 52, a raised annular rim portion 56, and a recessed, substantially conical cup portion 60. The diameter of shoulder portion 52 is slightly larger than the inner diameter of mounting portion 18 to provide an abutting shoulder for engagement with the mounting portion.

Cup portion 60, which is defined in part by surrounding rim portion 56, forms a cup for the caller's pursed lips, much like the cup used in trumpets. Cup portion 60 also defines an inlet opening for air passage 50. As shown best in FIG. 4, the longitudinal center axis of air passage 50 is parallel to but radially offset from the common longitudinal center axes of the mouthpiece and bell. The amount of offset, preferably, is equal to the radius of air passage 50 such that the common longitudinal axes of the mouthpiece and bell are coextensive with one edge of the air passage.

The cylindrical outer surface of plug 34 has an intermediate circumferential groove 64 adjacent shoulder portion 52, which provides a seat for O-ring 38. The plug's outer surface also has a knurled circumferential surface portion 66 (FIGS. 3 and 5) adjacent the outlet end surface, which provides a rough anti-slip surface for engagement with split ring 46. In between groove 64 and knurled surface portion 66 is a recessed surface portion 68 having one or more circumferential fastening grooves 70 (FIG. 5). Knurled surface portion 66 is most useful in an alternate form of the invention in which split ring 46 is omitted and the diaphragm is fastened directly against surface portion 68 using a rubber band or other fastening means, such that the diaphragm is in direct contact with anti-slip surface portion 68.

With reference to FIGS. 5 and 6, the outlet end surface of plug 34 will be described. The outlet end surface includes a frusto-spherical rim portion 74 which surrounds a pair of substantially flat, inclined surface portions 76a, 76b. Surface portions 76a, 76b are each inclined at an acute angle A (shown in second embodiment of FIG. 8), preferably about 10–20 degrees, relative to an imaginary perpendicular end surface of plug 34. Such inclined surface portions rise from opposite sides of rim portion 74 toward one another until they interface at a raised ridge or interface line 78. Ridge 78 is slightly off center (about 1/16 inch) from the longitudinal centerline of the plug and therefore does not intersect same. But for its foreshortened length and disposition just below the centerline, ridge 78 would bifurcate the outlet end surface of plug 34 into two halves.

Air passage 50 terminates at a flared end portion 80 (FIGS. 3 and 6) which lies substantially within the periphery of surface portion 76b. Flared end portion 80 includes a pair of opposing side channels 82 which are disposed at a steeper angle relative to surface portion 76b than the remainder of the flared end portion, so as to divert a portion of the column of air forced through the air passage laterally outwardly. A centralmost portion of end portion 80 intersects ridge 78, extending just across the ridge and into the expanse of inclined surface portion 76a. The surface area of the flared end portion at its broadest expanse (i.e., at the outlet end surface) is less than one-half the surface area of the outlet end surface. Thus, a substantial portion of the outlet end surface is substantially planar, providing a sound reflective surface for sound waves produced by the vibrating diaphragm.

Mouthpiece 10 is assembled in a multi-step procedure. O-ring 38 is stretched over the outlet end of plug 34 and moved toward shoulder portion 52 until it is seated in groove 64. Diaphragm 42, which has a half-moon shape in the preferred embodiment shown, is adhered or otherwise affixed to an outer, substantially semi-cylindrical surface portion of split ring 46 opposite the "split" portion of the ring. Thus, the diaphragm, which has an edge or seam 84, covers slightly over one-half of the surface area of the opening in the ring. The split ring is made of a hard polymeric or metal material which is sufficiently elastic to permit the split ends of ring 46 to be flexed at least slightly toward and away from one another. The split ring-mounted diaphragm is attached to the mouthpiece by spreading apart slightly the split ends of the ring and inserting the ring over the outlet end of plug 34 such that it contacts knurled surface portion 66. Split ring 46 is provided with a small circumferential lip 83 along its inner surface which cooperates with recessed portion 68 to provide a snap fit between the split ring and the plug. This helps prevent the diaphragm from being blown off the mouthpiece by air pressure.

The split ring and hence diaphragm affixed thereto is oriented circumferentially on the outlet end surface such that the diaphragm substantially covers flared end portion 80. Seam 84 of the diaphragm extends parallel to and just across ridge 78, but preferably stops just short of completely covering flared end portion 84 (as shown in FIG. 6). Thus, a small sliver-like opening leading to the air passage preferably is formed adjacent ridge 78 and seam 84. Knurled surface portion 66 provides a rough anti-slip surface to help maintain the diaphragm oriented on the outlet end surface in the manner just described.

The assembled mouthpiece is then inserted into mouthpiece mounting portion 18 of bell 14. The diameter of split ring 46 is less than the inner diameter of mounting portion 18 so as to provide a small amount of clearance between the mounting position and the split ring. O-ring 38 has a diameter slightly larger than the inner diameter of mounting portion 18 to provide a press fit and continuous circumferential seal between the mouthpiece and the mounting portion of bell 14. The inner surface of the mounting portion may be provided with a circumferential groove aligned with the O-ring to seat the O-ring within the mounting portion.

OPERATION AND USE

Assembled mouthpiece 34 may be used with or without the bell. Although the bell serves to amplify and enhance the quality of the sound produced by the mouthpiece, the mouthpiece by itself is capable of producing realistic wildlife calls. If desired, the caller's hands can be cuppped around the outlet end surface ot affect the sound produced by the mouthpiece.

In operation, a user's pursed lips are placed in contact with cup portion 60. The lips do not contact the vibratable diaphragm. Air is then blown through air passage 50 with sufficient force to cause diaphragm 42 to vibrate. The vibration of the diaphragm is casued by air escaping along the seam of the diaphragm adjacent ridge 78.

Air passage 50 is flared at end portion 80 to spread the column of air in the air passage more widely across the inner surface of the diaphragm. Channels 82 serve to divert a portion of the column of air to the sides of the diaphragm to facilitate this purpose. Inclined surface portion 76a acts as a sound board or reflective surface for the sound waves created by the vibrating diaphragm.

It is important for the diaphragm to be completely sealed around its semi-circular circumference so that the back pressure in the air passage forces the air to escape to the atmosphere only along the diphragm seam. Stated differently, the outlet end surface of the plug and the configuration and orientation of the diaphragm are such that while the air column in the air passage is desirably spread across substantially the entire inner surface of the diaphragm, the air is permitted to escape only along the seam. It is threfore important that the diaphragm be tightly sealed against knurled surface portion 66 to prevent air leaks. In the preferred embodiment, this is accomplished by creating a continuous unbroken seal by adhering the diaphragm's outermost circumferntial edge to the outer surface of the split ring.

It is also desirable for the diaphragm seam to be stretched slightly acorss the outlet end surface of the mouthpiece, including surface portion 76a, so as to be turned to a predesired frequency but not urged against the outlet end surface with such force as to prevent air from escaping along the entire seam. This stretch fit of the diaphragm on the outlet end surface is facilitated by inclined surface portions 76a, 76b and ridge 78 which serve to increase the contact force between the outlet end surface and the diaphragm along the seam. Notably, the diaphragm may be sized and configured to cover the entire flared outlet portion of the air passage, closing off the sliver-like opening, so long as air is still permitted to escape along the seam.

The present invention is simple to use, even for beginners. The caller blows air through pursed lips into the cup portion of the mouthpiece. The pitch of the call can be easily varied by placing one or more fingers tightly against the seam of the diaphragm on either or both sides of the flared outlet opening to change the effective length of the seam along which air is permitted to escape. The pitch of the sound produced by the mouthpiece is largely determined by the effective length of the seam. The effective length of the seam is variable depending upon the location(s) of the finger pressure point(s) along the seam. The access openings of bell 14 enable the user to access the diaphragm seam with one or two fingers when the bell is attached to the mouthpiece.

Though not an essential component, the bell enhances the sound produced by the vibrating diaphragm in many applications by, among other things, amplifying the sound and promoting a fuller sound through resonance.

The diaphragm and split ring are easily detachable from the mouthpiece to facilitate maintenence or replacement of the diaphragm. If desired, various diaphragm configurations and designs can be employed to produce a wider variation of calls. For example, the degree tension or stretching to which the diaphragm is subject once it is snapped onto the mouthpiece is one variable which affects the diaphragm's natural frequency. In addition, the sound can be varied by adjusting the circumferential orientation of the diaphragm with respect to the flared outlet portion, varying the air presure, varying the duration of the air pulses, varying the caller's embouchure, and using diaphragms of different thicknesses, materials and densities. These variables can affect one or more sound characteristics, including pitch, volume, modulation and tone.

ALTERNATE EMBODIMENTS

In addition to other modifications obvious from this description, there are alternate ways in which the diaphragm can be mounted to the plug. For example, the half-moon shaped diaphragm can be provided with an enlarged radius and affixed to the plug without using a split ring, such that a circumferential edge portion of the diaphragm overlies recessed portion 68. Such diaphragm edge portion then can be tightly fastened to and sealed against the recessed portion by, for example, one or more rubber bands or adhesive tape wrapped around the outer surface of the mouthpiece, particularly the recessed surface portion. Where rubber bands or the like are used as the fastening means, grooves 70 serve to provide a seat for the multiple loops of the rubber band.

FIGS. 7 and 8 show alternate embodiments of the split ring and plug, respectively. Like components corresponding to those previously discussed are given corresponding reference numerals in the "100" series.

The split ring shown in FIG. 7 is similar to the one shown in FIG. 3 except that the ends of the split ring are joined together by an elastomeric member 188. Member 188 provides an elastic connection between the split ends of the split ring. Split ring 146 is formed by taking an unbroken ring and cutting out a small section thereof. The separated ends of the split ring are compressed slightly together to partially close the gap between the split ends, and then member 188 is adhered to such ends while the split ring is in a slightly compressed state. In such compressed state, the inner diameter of the split ring is slightly less than the outer diameter of knurled surface portion 66.

In the split rings' disassembled state, the diaphragm affixed thereto is in an essentially relaxed, unstretched condition. However, when the split ring is fastened to the plug, requiring the split ends to be stretched apart slightly, the diaphragm is stretched slightly to have a predesired frequency. In this way, the diaphragm is pretuned once it is inserted onto the mouthpiece. If the diaphragm becomes damaged, out of tune or otherwise in need of replacement, it can be easily replaced with a substitute pretuned diaphragm with the same or different frequency or other sound-related characteristics. Member 188 urges the split ends toward one another, thereby to help retain the split ring in place on the mouthpiced and minimize any air leakage between the split ring and knurled surface portion.

The plug 134 shown in FIG. 8 is identical to the plug previously described, except that a portion of air passage 150 has been enlarged to reduce the amount of material required during the injection molding process.

Having illustrated and described the principles of my invention with reference to one preferred embodiment, it should be apparent to those persons skilled in the art that such invention may be modified in arrangement and detail without departing from such principles.

I claim as my invention all such modifications as come within the true spirit and scope of the following claims:

1. A game call comprising:
   a rigid body having a substantially cylindrical outer surface and opposed inlet and outlet end surfaces;
   air passage means defining an internal air passage in said body, said air passage having an inlet opening in said inlet end surface and an outlet opening in said outlet end surface;
   a vibratable diaphragm; and
   fastening means for fastening said diaphragm to said body such that at least a portion of said diaphragm contacts said outlet end surface and overlies in sound reproducing relationship at least a portion of said outlet opening, whereby air forced through said air passage exits said outlet opening and causes said diaphragm to vibrate and produce a sound simulative of a form of wildlife;
   said inlet end surface including a recessed, substantially conical portion, said inlet opening being disposed within said conical portion.

2. A game call comprising:
   a rigid body having a substantially cylindrical outer surface and opposed inlet and outlet end surfaces;
   air passage means defining an internal air passage in said body, said air passage having an inlet opening in said inlet end surface and an outlet opening in said outlet end surface;
   a vibratable elastic diaphragm;
   fastening means for fastening said diaphragm to said body such that a first portion of said diaphragm contacts said outlet end surface and overlies in sound reproducing relationship at least a portion of said outlet opening, and a second portion of said diaphragm overlies at least a portion of said outer surface, whereby air forced through said air passage exits said outlet opening and causes said diaphragm to vibrate and produce a sound simulative of a form of wildlife;
   said air passage including a flared outlet portion terminating at said outlet opening, said diaphragm having a seam which for at least a portion of its length contacts said outlet end surface and extends across said outlet end surface;
   said diaphragm overlying at least a substantial portion of said outlet opening, said seam for at least a portion of its length passing in proximate relationship to a peripheral edge portion of said outlet opening, thereby permitting air forced through said air passage to exit said outlet opening at said peripheral edge portion and along said seam;
   said outlet end surface including substantially planar first and second surface portions, said first and second surface portions each being inclined and adjoining one another at a raised ridge extending centrally across said outlet end surface; and
   said outlet opening lying wholly within said first surface portion except for said peripheral edge portion which intersects said raised ridge and extends into said second surface portion, said diaphragm overlying entirely said first surface portion with said seam just overlying said ridge.

3. A game call comprising:
   a rigid body having a substantially cylindrical outer surface and opposed inlet and outlet end surface;
   air passage means defining an internal air passage in said body, said air passage having an inlet opening in said inlet end surface and an outlet opening in said outlet end surface;
   a vibratable elastic diaphragm;
   fastening means for fastening said diaphragm to said body such that a first portion of said diaphragm contacts said outlet end surface and overlies in sound repoducing relationship at least a portion of said outlet opening, and a second portion of said diaphragm overlies at least a portion of said outer surface, whereby air forced through said air passage exits said outlet opening and causes said diaphragm to vibrate and produce a sound simulative of a form of wildlife;
   said air passage including a flared outlet portion terminating at said outlet opening, said diaphragm having a seam which for at least a portion of its length contacts said outlet end surface and extends across said outlet end surface;

said diaphragm overlying at least a substantial portion of said outlet opening, said seam for at least a portion of its length passing in proximate relationship to a preripheral edge portion of said outlet opening, thereby permitting air forced through said air passage to exit said outlet opening at said peripheral edge portion and along said seam;

said outlet end surface including substantially planar first and second surface portions, said firt and second surface portions each being inclined and adjoining one another at a raised ridge extending centrally across said outlet end surface; and said outlet end surface further including a frustospherical rim surrounding said first and second surface portions.

4. A game call comprising:

a rigid body having a substantially cylindrical outer surface and opposed inlet and outlet end surface;

air passage means defining an internal air passage in said body, said air passage having an inlet opening in said inlet end surface and an outlet opening in said outlet end surface;

a vibratable elastic diaphragm;

fastening means for fastening said diaphragm to said body such that a first portion of said diaphragm contacts said outlet end surface and overlies in sound reproducing relationship at least a portion of said outlet opening, and a second portion of said diaphragm overlies at least a portion of said outer surface, whereby air forced through said air passage exits said outlet opening and causes said diaphragm to vibrate and produce a sound simulative of a form of wildlife;

said air passage including a flared outlet portion terminating at said outlet opening, said diaphragm having a seam which for at least a portion of its length contacts said outlet end surface and extends across said outlet end surface; and said flared outlet portion including opposed laterally directed channel portions and opposed intermediate portions therebetween, said channel portions being disposed at a steeper angle of incline relative to said outlet end surface than said intermediate portions.

5. A game call comprising:

a rigid body having a substantially cylindrical outer surface and opposed inlet and outlet end surfaces;

air passage means defining an internal air passage in said body, said air passage having an inlet opening in said inlet end surface and an outlet opening in said outlet end surface;

a vibratable diaphragm; and fastening means for fastening said diaphragm to said body such that at least a portion of said diaphragm contacts said outlet end surface and overlies in sound reproducing relationship at least a portion of said outlet opening, whereby air forced through said air passage exits said outlet opening and causes said diaphragm to vibrate and produce a sound simulative of a form of wildlife;

said air passage including a flared outlet portion proximate said outlet end surface, said diaphragm having a seam which for at least a portion of its length contacts said outlet end surface and extends across said outlet end surface;

said fastening means including a split ring to which said diaphragm is attached, said outer surface having a shoulder portion adjacent said outlet end surface, said split ring having an inner diameter which is slightly less than the diameter of said shoulder portion such that when said split ring is inserted onto said shoulder portion said diaphragm is stretched across said end surface.

6. A mouthpiece adpated for use as a game call, the mouthpiece comprising:

a rigid body having a substantially cylindrical outer surface and opposed inlet and outlet end surfaces;

air passage means defining an internal air passage in said body, said air passage having an inlet opening in said inlet end surface and an outlet opening at said outlet end surface;

said outlet end surface including a pair of substantially planar first and second surface portions inclined with respect to one another and adjoining one another at a raised ridge extending centrally across said outlet end surface; and said outlet opening having a peripheral edge portion and lying predominantly within a boundary defined by said first surface portion, except for said peripheral edge portion which intersects said ridge and extends into said second surface portion.

7. A mouthpiece according to claim 6 further including a vibratable elastic diaphragm having a substantially straight seam, and supporting means for supporting said diaphragm in contact relationship against said outlet end surface such that said diaphragm completely covers said first surface portion and raised ridge and covers all but a sliver-like portion of said outlet opening, said sliver-like portion being located within a boundary defined by said second surface portion.

8. A mouthpiece according to claim 7 wherein said air passage is flared at said outlet opening and said ridge passes proximate to and offset from a longitudinal center axis of said outlet end surface.

9. A mouthpiece adapted for use as a game call, the mouthpiece comprising:

a rigid body having a substantially cylindrical outer surface and opposed inlet and outlet end surfaces; and air passage means defining an internal air passage in said body, said air passage having an inlet opening in said inlet end surface and a flared outlet opening at said outlet end surface;

said flared outlet opening having a surface area which is less than one-half the surface area of said outlet end surface;

said outlet end surface including substantially planar first and second surface portions, each surface portion being inclined and adjoining the other at a raised ridge extending centrally across said outlet end surface;

said flared outlet opening lying within the periphery of said first surface portion except for one edge portion of said flared outlet portion which extends across said ridge and into said second surface portion;

said mouthpiece having a first longitudinal center axis, said air passage having a seocnd longitudinal center axis parallel to but offset from said first longitudinal center axis.

* * * * *

UNITED STATES PATENT AND TRADEMARK OFFICE
CERTIFICATE OF CORRECTION

PATENT NO. : 4,950,198

DATED : August 21, 1990

INVENTOR(S) : Edward R. Repko, Jr.

It is certified that error appears in the above-identified patent and that said Letters Patent is hereby corrected as shown below:

```
Column 2, line 41, "of" should be --to--.
Column 3, line 58, "intenal" should be --internal--.
Column 4, line 28, after "will" insert --now--.
Column 5, line 46, "cuppped" should be --cupped--.
Column 5, line 46, "ot" should be --to--.
Column 5, line 66, "diphragm" should be --diaphragm--.
Column 6, line 14, "turned" should be --tuned--.
Column 6, line 56, "presure" should be --pressure--.
Column 7, line 39, "mouthpiced" should be --mouthpiece--.
```

UNITED STATES PATENT AND TRADEMARK OFFICE
CERTIFICATE OF CORRECTION

PATENT NO. : 4,950,198

DATED : August 21, 1990

INVENTOR(S) : Edward R. Repko, jr.

It is certified that error appears in the above-identified patent and that said Letters Patent is hereby corrected as shown below:

In the Claims:

Claim 3, column 8, line 48, "surface" should be --surfaces--.

Claim 3, column 9, line 9, "firt" should be --first--.

Claim 4, column 9, line 18, "surface" should be --surfaces--.

Claim 9, column 10, line 63, "seocnd" should be --second--.

Signed and Sealed this

Tenth Day of March, 1992

Attest:

HARRY F. MANBECK, JR.

Attesting Officer

Commissioner of Patents and Trademarks